United States Patent [19]

Fahey

[11] Patent Number: 5,356,452
[45] Date of Patent: Oct. 18, 1994

[54] METHOD AND APPARATUS FOR RECLAIMING WASTE MATERIAL

[76] Inventor: Robert E. Fahey, 2200 Corporation Blvd., Naples, Fla. 33942

[21] Appl. No.: 65,026

[22] Filed: May 24, 1993

Related U.S. Application Data

[63] Continuation of Ser. No. 418,830, Oct. 5, 1989, abandoned, which is a continuation of Ser. No. 203,709, Jun. 7, 1988, abandoned.

[51] Int. Cl.⁵ .................. C05F 9/00; C05F 9/02; B09B 3/00
[52] U.S. Cl. .................. 71/10; 71/9; 71/901; 405/128; 405/129
[58] Field of Search .................. 71/9, 10, 11, 901; 405/125, 128, 129

[56] References Cited

U.S. PATENT DOCUMENTS

| | | | |
|---|---|---|---|
| 3,579,320 | 5/1971 | Pesses | 71/9 |
| 4,100,023 | 7/1978 | McDonald | 71/10 X |
| 4,169,048 | 9/1979 | Albers, Sr. | 71/10 X |
| 4,204,842 | 5/1980 | Morel et al. | 71/10 X |
| 4,333,757 | 6/1982 | Kurtzman | 71/901 X |
| 4,350,461 | 9/1982 | Valiga et al. | 405/128 |
| 4,464,081 | 8/1984 | Hillier et al. | 405/128 |
| 4,551,243 | 11/1985 | Martin | 71/9 X |
| 4,608,126 | 8/1986 | Watson et al. | 71/25 X |
| 4,643,111 | 2/1987 | Jones | 71/10 |
| 4,696,599 | 9/1987 | Rakocyznski et al. | 405/129 |

FOREIGN PATENT DOCUMENTS

| | | |
|---|---|---|
| 3508824A1 | 9/1986 | Fed. Rep. of Germany . |
| 3800504 | 7/1989 | Fed. Rep. of Germany ...... 405/125 |
| 58-33618(A) | 2/1983 | Japan . |
| 61-178086(A) | 9/1986 | Japan . |
| 9003232 | 4/1990 | World Int. Prop. O. .......... 405/129 |

OTHER PUBLICATIONS

Kirk–Othmer, Encyclopedia of Technology, vol. 21, pp. 648–650.

Primary Examiner—Ferris Lander
Attorney, Agent, or Firm—Merrill N. Johnson

[57] ABSTRACT

The present invention provides for reusable waste recovery. The method of the present invention is to provide one or more cells. A substantially impermeable liner is positioned into the one or more cells. An impermeable domed structure is erected over the cell. Waste material and cover soil is added to the cells. The waste material and cover soil is added to the cells such that when each of the cells are filled, the ratio of waste material to cover soil is from about 1:5 to about 10:1. The cells, including the waste material and cover soil, are covered with a substantially impermeable cover after which the impermeable domed structure is moved to another cell. The decomposition of the waste is controlled and monitored in the cells. After a period of time, the material within the one or more cells is recovered and recycled. The cell can then be reused for further waste disposal.

22 Claims, 3 Drawing Sheets

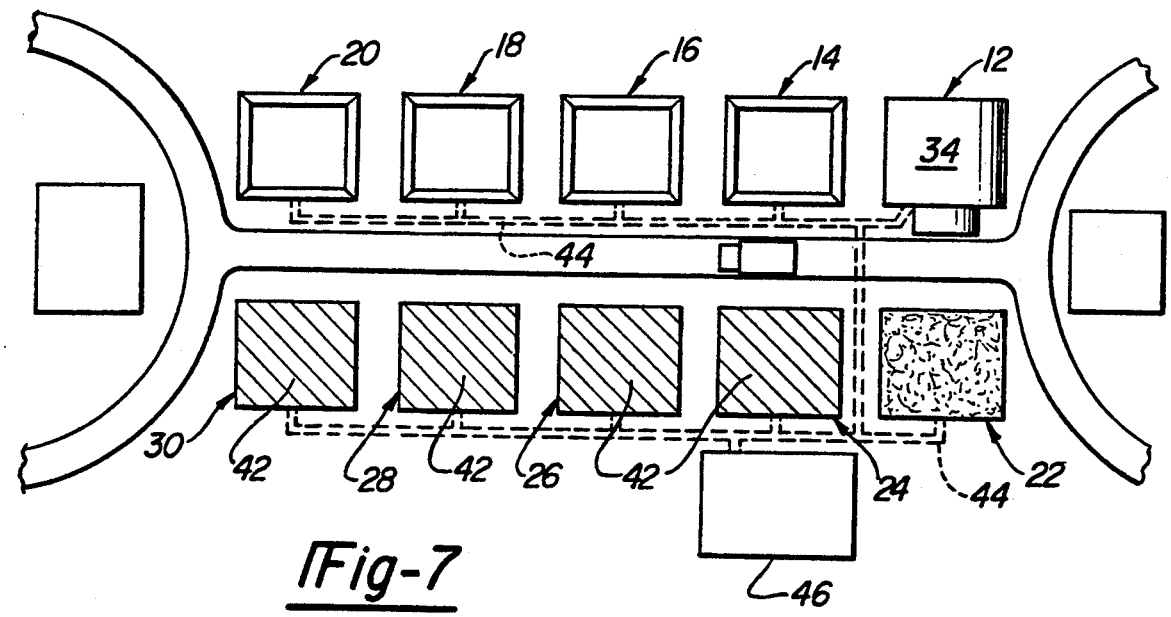
_Fig-7_
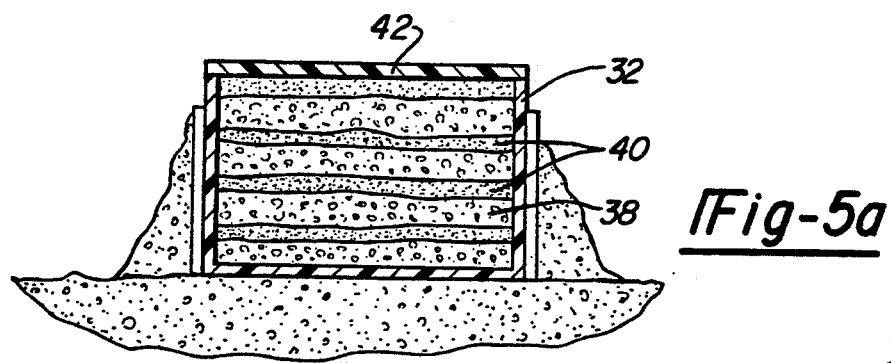
_Fig-5a_
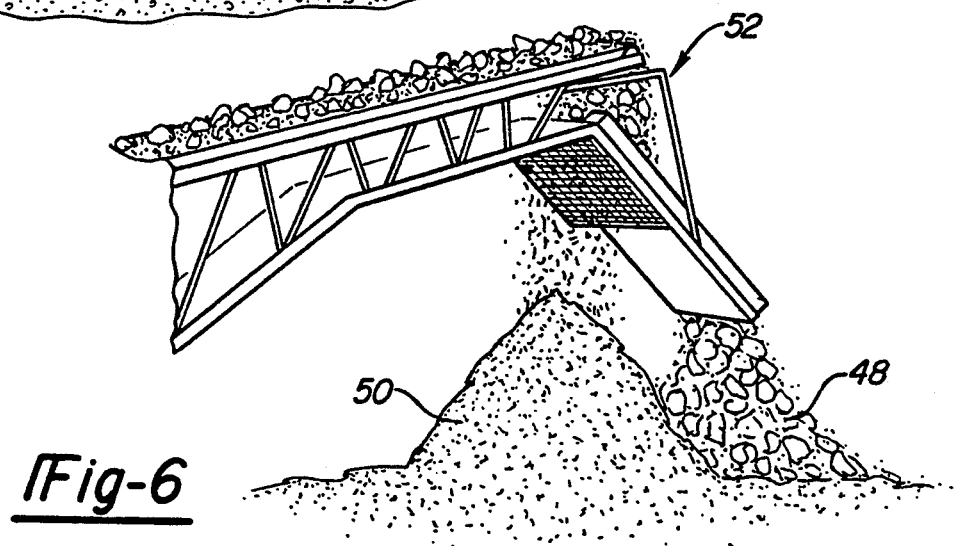
_Fig-6_

METHOD AND APPARATUS FOR RECLAIMING WASTE MATERIAL

This is a continuation of U.S. Ser. No. 418,830 filed Oct. 5, 1989 now abandoned, which is a continuation of Ser. No. 203,709 filed on Jun. 7, 1988 now abandoned.

BACKGROUND AND SUMMARY OF THE INVENTION

The present invention relates to waste reclaiming systems and, more particularly, to reclaiming systems which are reusable.

Major metropolitan areas produce tons of garbage and waste material every day. The garbage and waste material is generally collected by sanitation departments and hauled off to disposal sites or burned in costly waste to energy conversion plants to reduce volumee and generate energy. In some instances, due to high land costs, the garbage and waste material may be transported to another state for disposal. In most areas, the disposal method of choice is use of a landfill. This use of a landfill has involved simply burying the waste. Generally, the landfills are filled with garbage and waste material and covered over when completed. The site is thereafter ill-suited for most purposes. Sites can also be a source of groundwater and air pollution. Anerobic decomposition at the site will produce contamination such as hydrogen sulfide and methane gases. As the amount of garbage continues to increase and the available land for landfills diminishes, there is a need for an alternative to long-term dedication of ever-increasing amounts of land to landfills that are themselves sources of pollution.

Previous landfill methods have also resulted in concerns regarding dangerous leachates. Leachates are produced as the result of liquids percolating through the wastes. Concern over leachates has caused regulation of landfills. Current regulations require impermeable liners to prevent leachates from contaminating groundwater supplies. This concern demands a solution to minimize the amount of leachate produced to afford maximum protection of the groundwater.

Several different types of garbage and waste recovery systems are illustrated in the art. Generally, these garbage and waste recovery systems are illustrate by the following patents. U.S. Pat. Nos. 4,696,599, issued Sept. 29, 1987 to Rakoczynski et al; 4,643,111, issue, Feb. 17, 1987 to Jones; 4,464,081, issued Aug. 7, 1984 to Hillier et al; 4,350,461, issued Sep. 21, 1982 to Valiga et al; 3,579,320, issued May 18, 1971 to Pesses; German Patent No. 3508824, issued Sep. 18, 1986; Japanese Patent No. 61-178086, issued Aug. 9, 1986; and Japanese Patent No. 58-33618, issued Feb. 26, 1983. These patents disclose different disposal systems.

The above-referenced patents, however, have several disadvantages. One disadvantage is that the above-identified art calls for the dedication of capital equipment at one limited site yet does not provide for the reuse of the components of the system. Another disadvantage is that combustible and even potentially explosive materials such as methane and hydrogen sulfide gas are not eliminated or controlled. The above art does not provide for the full reclaiming of the full range of materials after they have been introduced to the landfill. The above systems also produce a substantially large amount of leachate with no mechanism to effectively control or contain that leachate. The systems also do not allow for easy repair of contamination paths should one occur. The systems also require expensive mechanisms and devices to treat the resultant leachate.

Accordingly, it is an object of the present invention to overcome the disadvantages of the relevant art. The present invention provides a method which enables reuse of a site dedicated to a landfill and also reuse of the components within the landfill. The present invention provides for control and use of combustible and/or harmful gases that are given off during the decomposition of the waste material. The present invention enables reclamation of the by-products of the completed landfill, many of them being capable of reuse. The present invention limits the amount leachates produced and provides effective use of the leachates in decomposition of the wastes. The present invention allows for inspection of leachate collection systems and cell liners and enables the repair or replacement of both. The present invention also enables continuous reuse of the landfill site instead of covering it and rendering the land unfit for most other purposes.

The present invention provides a method for processing waste material whereby a cell of waste material is created, this cell being sealed off from the surrounding environment by means of a liner and a cover. The waste material is monitored for decomposition and its leachate recirculated to enhance the decomposition. After decomposition has occurred, the resultant material may be removed and separated into usable fractions such as soil and recyclable metals, rubber, glass and plastics. The empty cell may thereafter be reused for processing another batch of waste.

From the following detailed description and claims taken in conjunction with the drawings, other objects and advantages of the present invention will become apparent to those skilled in the art.

BRIEF DESCRIPTION OF THE DRAWINGS

FIG. 5A is a vertical cross-sectional view of a filled cell created above ground level.

FIG. 6 is a perspective view illustrating the removal and separation of material from the cell in accordance with the present invention.

FIG. 7 is a plan view like that of FIG. 1 with several of the cells filled.

DETAILED DESCRIPTION OF THE PREFERRED EMBODIMENT

Figure 1:
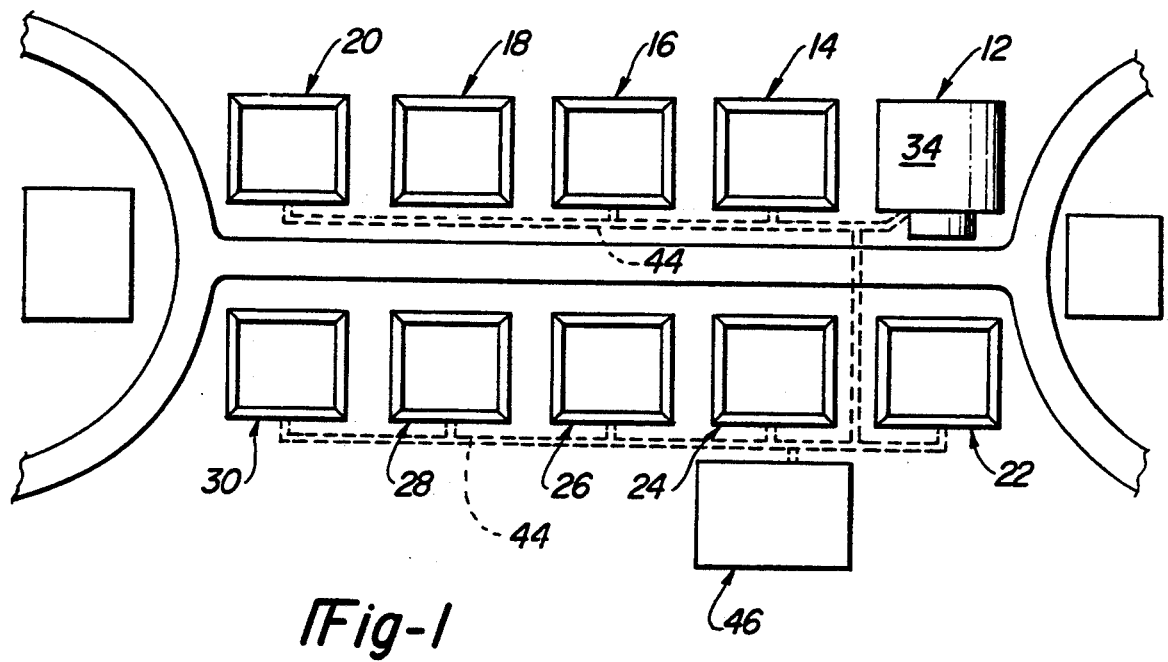
FIG. 1 is a plan view of a reclaiming landfill site in accordance with the present invention.
Figure 2:
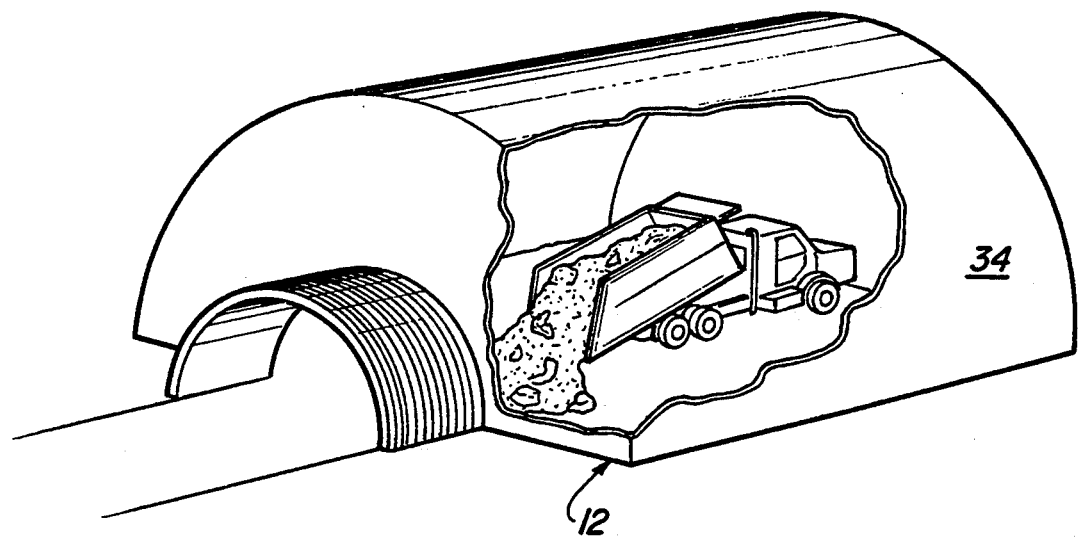
FIG. 2 is a perspective view of a single cell in FIG. 1 with a standing cover. The truck is not to scale with the size of the cell as taught in the specification.

Referring to the figures, a system for handling and reclaiming waste material is illustrated. The system generally includes one or more cells 12–30.

For ease of explanation, the cells are arbitrarily designated first to tenth and correspond with reference numerals 12–30 (i.e., first reference numeral 12, second reference numeral 14, etc.). Also, the cells are divided into two columns. The following explanation of a single cell will apply to all the cells at one time or another during the disposal and reclaiming process. The progressive reclaiming process stages, as will be explained herein, occur at different times to different cells. However, all cells will go through the below-described stages at different times during the reclaiming process. Thus, the, explanation of a single cell will apply to all the cells.

The cells are formed in or on the ground and generally have an overall rectangular shape, as show. in FIG. 1. The depth varies accordingly to the width and length of the cell. Ordinarily, the first cell 12 is formed as a starting point for the reclaiming process. The remaining second through tenth cells may be formed at the same time the first cell is formed or at any point in time during functioning of the system. A system may also consist of a single cell 12.

Figure 5:
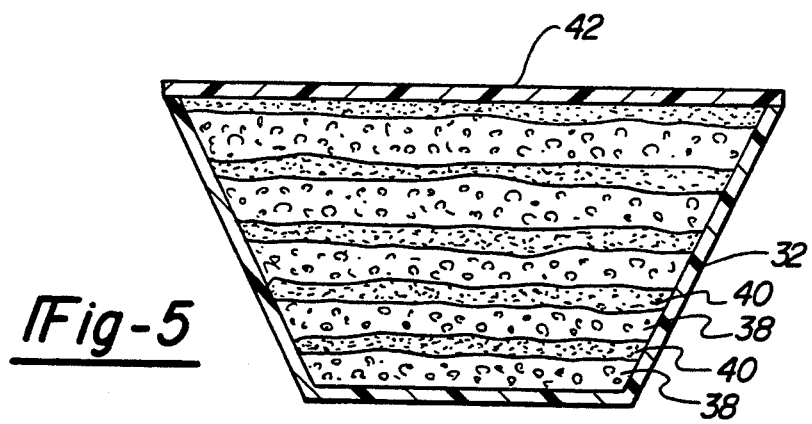
FIG. 5 is a vertical cross-sectional view of a filled cell of FIG. 4 in accordance with the present invention.

A liner 32, as seen in FIG. 5, is positioned in the first cell 12. Preferably, the liner 32 is formed from materials such as high density polyethylene or the like. The liner 32 material is selected to be satisfactory in preventing leachate or the like from seeping through the liner into the surrounding earth or ground water from entering the cell. The liner 32 forms to the contour of the cell 12 and is inspected for tears or the like to insure that the liner 32 is impermeable to liquid or the like attempting to enter or exit the lined cell.

After the liner 32 has been positioned into the first cell 12, a domed cover structure 34 is placed over the first cell 12. The domed cover structure 34 may be an inflatable dome or bubble with airlocks that allow a positive pressure to be maintained to support the structure yet still allow passage of personnel, vehicles, refuse and the like into and out of the cell 12. Positive pressure may be maintained by fans powered by electricity generated from methane or other combustible by-products of the landfill. The domed cover structure 34 is large enough to enable trucks or the like to pass into the cell. The domed cover structure 34 prevents water such as rain, precipitation or the like from entering the first cell 12 during filling of the first cell 12 with garbage and waste material. The domed cover structure 34 controls the leachate formation during filling of the cell by this control and/or elimination of the entry of water which includes precipitation during or after falling. The control of additional moisture added to the cell during its filling reduces the rate of decomposition of the waste, reducing the formation of combustible or unpleasant gases, hence allowing for more pleasant and efficient operations The use of covers to control the environment also denies access to undesirable vectors such as birds or small animals.

Figure 3:
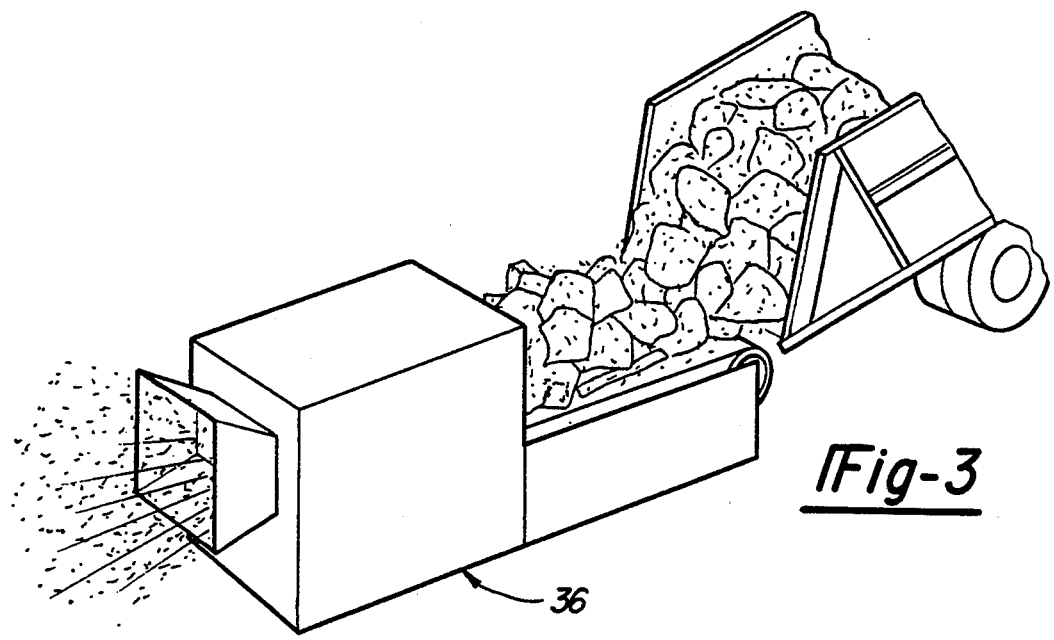
FIG. 3 is a perspective view illustrating the preparation of material for introduction into the cell in accordance with the present invention.

After the liner has been positioned in the first cell 12 and checked for perforations, waste material may be added into the first cell 12. Preferably, the garbage or waste material is ground up by a grinder 36 as seen in FIG. 3 to reduce the formation of microenvironments. Grinding may take the form of any method to homogenize the waste and thereby reduce microenvironments and/or accelerate decomposition. Use of a grinder 36 provides for a more homogeneous environment within the cell Microenvironments are often localized pockets of waste whose time for bioreduction differs substantially from the cell content as a whole. An example of a microenvironment may be space inside an impermeable plastic bag. It is possible that microenvironments may form in large chunks of waste, taking additional time to decompose or creating undesirable pockets of microorganisms.

The ground-up garbage and waste material may be added directly into the lined first cell 12. A layer of waste material 38 is placed in the lined cell possibly followed by an alternating layer of cover soil 40 such as dirt, nonbiodegradable material, partially biodegraded material or the like as seen in FIG. 5. Alternating layers of cover soil with garbage reduces or retards the potential for combustion and limits the ability of combustion to travel, much like fire breaks in a building. This process of alternating layers of waste material 38 and cover soil 40 is continued until the first cell 12 is full. Also, it is possible that the garbage and waste material be added to the cell directly eliminating the layering. Either method works effectively to enable the decomposition or bioreduction of the biodegradable garbage or waste material. Bioreduction, biodegradation, decomposition and composting are used to refer to the action of oxygen, microorganisms and the like on organic matter.

When the first cell 12 is full, the ratio of waste material to cover soil can vary widely but often ranges from about 1:5 to about 10:1; preferably from about 1:3 to about 10:1; and highly preferred at from about 1:1 to about 10:1.

As can be seen in FIG. 5, the waste material 38 and cover soil 40 are positioned into the first cell 12 until the first cell 12 is full. Once the first cell 12 is full, a cover 42 is placed over the first cell 12. The cover 42 is impermeable to rain, precipitation or the like. The color of the cover can be used to capture or reflect heat and thereby affect the rate of decomposition. The cover 42 helps to reduce the formation of leachate by preventing the introduction of surface or rain water. The top of the finished cell is flat and surrounded by a perimeter dike which accepts additional moisture which can be introduced into the cell at a controlled rate depending on the desired rate of decomposition.

Once the first cell 12 has been covered with cover 42, the domed cover structure 34 is moved from the first cell 12 to cover the second cell 14. Conduit 44 is associated with the first through tenth cells 12-30 for draining leachate from the cells. Excess leachates collected from the bottom liner (a maximum of 12 inches is allowable) may be recirculated through the cell. Excess leachates drained from the cells via conduit 44 may be recirculated or processed in a leachate treatment facility 46. Also, a conduit (not shown) is associated with the first through tenth cells to enable water or recirculated leachate to be passed into the cells to control the rate of decomposition and the amount of leachate formation. Water or recirculated leachate introduced into a cell provides a more favorable environment for microorganisms and hence speeds up the rate of decomposition. Genetically engineered or selected strains of microorganisms such as acidogens or methanigens can be seeded in the mixture to accelerate the decomposition. Further, other conduits are associated with the first through tenth cells to enable removal and use of the methane produced during the decomposition of the biodegradable waste material.

After the first cell 12 has been cove red with cover 42, it is monitored. During monitoring, water or the like may be added to the decomposing material to accelerate its decomposition. Thus, since the addition of water is controlled, so is the leachate. The leachate would be monitored and any excess removed from the cells or recirculated via conduit 44. The cover encapsulates the waste and traps the gases that form. Methane gas or other gaseous by-products of bioreduction are bled off of the cell as the waste material decomposes. The methane gas or the like may be used to run engines or generate electricity which powers fans which hold up the domed cover structure 34. Thus, the methane gas, which is produced during decomposition, is utilized to power different machinery during the operation of the system.

Figure 4:
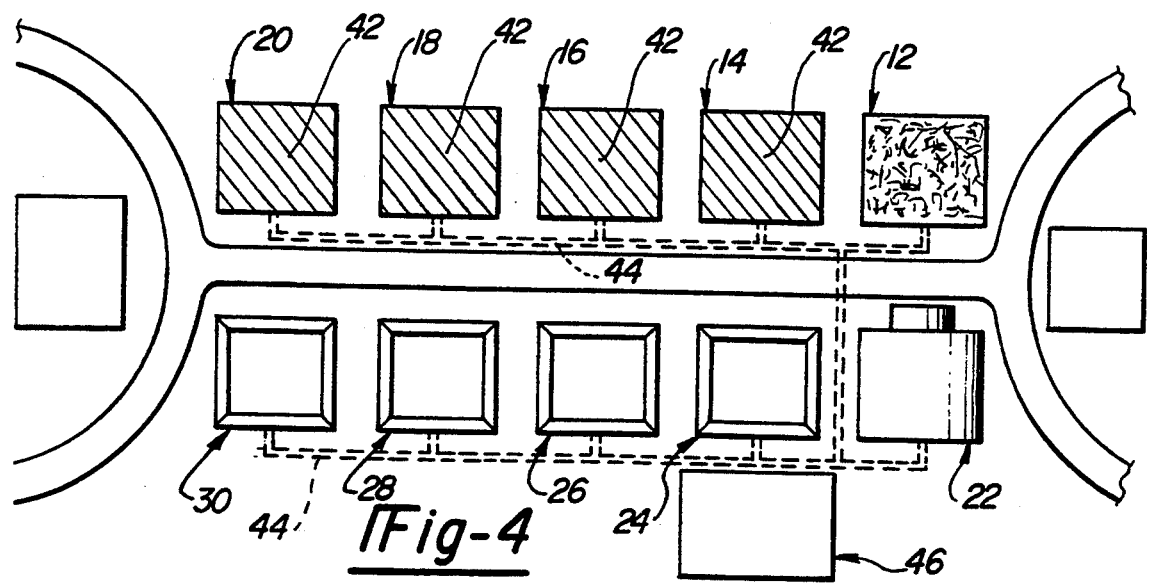
FIG. 4 is a plan view like that of FIG. 1, with several of the cells filled.

The above-identified process is started on the second cell 14. The process is repeated and continues at all of the cells until all the cells have been filled and covered as seen in FIGS. 4 and 7.

At or about the time that the first column of cells (first cell 12 through fifth cell 20) is filled with waste material and cover soil, the first cell 12 should be ready for mining or reclaiming. A cell may be considered ready when rate of decomposition levels off or when bioreduction is substantially complete. Preferably, the sixth cell 22, which opposes the first cell 12, is ready to be filled with waste material and cover soil, as explained above. Also at this time, the cover soil, such as dirt, is mined from the first cell 12 to provide the cover soil of the sixth cell 22 as s in FIG. 4.

During mining or reclaiming as illustrated in FIG. 6, the nonbiodegradable material 48 which includes metals, glass, rubber and plastic materials which are not decomposed, is separated out from the humus or dirt 50 by a mining apparatus 52. Separation of materials can take the form of sifting, shaking, screening, trommeling, etc. The material may be sifted or the like to separate the dirt or humus 50 from the solid metallic, rubber, glass and plastic materials 18. The metallic material such as aluminum, tin, copper, brass and the like is recycled, as are the glass and rubber materials. The plastic material such as bags, bottles and the like is reclaimed for use as fuel or for recycling. Thus, the recovering of material from the first cell 12 produces valuable fractions which can be put to use. The seventh 24 through tenth 30 cells are continued to be filled as explained above and are supplied with cover soil from the second 14 through fifth 20 cells. Thus, as the cells are filled down the column, the opposing cell is mined or reclaimed as seem in FIG. 4.

Once the tenth cell 30 is filled, it is time to move back to again fill the first cell 12 as seen in FIG. 7. The liner 32 in the now empty first cell 12 is inspected for tears or perforations. If no perforations or tears appear, the liner 32 is reused. If perforations or tears are present, and the liner 32 cannot be repaired, the liner is replaced to maintain its integrity against the transmission of leachates. The domed cover structure 34 is removed from the tenth cell 30 and positioned above the first cell 12. Garbage and waste material along with the cover soil, preferably from the sixth cell 22 as explained above, is added into the first cell 12. The above-identified process is again repeated. The process is designed to continue indefinitely. This enables the above-disclosed landfill reclaiming site to be continually reused. The reusability, along with being economical, does not destroy the land nor render it unfit for future alternative uses. Thus, the invention provides a reusable landfill reclaiming system that may be set up in a designated area and continued to be used and reused indefinitely all the while controlling groundwater contamination and gaseous emissions.

FIGS. 4 and 7 illustrate progressive times during the process. In FIG. 4, the first cell is being mined by a mechanism like that of FIG. 6 to provide cover soil for use in the sixth cell 22 and other reusable materials. The second 14 through fifth 20 cells remain covered while the seventh 24 through tenth 30 are yet to be filled.

In FIG. 7, the process has been completed through a cycle. The first cell 12 is in the process of being filled again. The second 14 through fifth 20 cells have been mined. The sixth cell 22 is being mined to provide cover soil for the first cell 12. The seventh 24 through tenth 30 cells are covered while decomposition occurs.

Generally during mining or reclaiming of the cells, there is more than enough cover soil from the mined or reclaimed cell than is necessary for use as cover soil in the opposing cell of the other column. This additional cover soil results from the composting of the biodegradable material into humus. Whereas, for example, a freshly filled cell may be 80% new garbage and 20% cover soil, after bioreduction in the cell is complete, the ratio may now be 20% of nonbiodegradable material and 80% humus/dirt mixture. The reclaimed soil meets most toxicological safety standards and may be sold as top soil, humus, peat or the like. Thus, the present invention produces a number of reusable reclaimed products.

An example of a landfill reclaiming system in accordance with the present invention would be as follows A site on the order of several hundred acres would need to be acquired. A location having dimensions of approximately 3,000 ft.×2,400 ft. would be utilized for the cells. It is hypothesized that a site of this size would be able to contain approximately 7.2 million tons of waste material.

The 2,400 ft. dimension would be divided into two equal parcels. The 3,000 ft. dimension would be subdivided into a plurality of segments such as four or five equal segments. If divided into five segments, the cells would therefore have 1,200 ft.×600 ft. dimensions of a rectangular nature. Provisions could be made for access lines to the cells. A liner would be used having a thickness of approximately 60 mils and be manufactured from a high density polyethylene material. A cover would be used having a 30 mil thickness and be manufactured from a high density polyethylene material.

A leachate collection, recycling, and treatment system would be provided. The base liner would be installed into the first cell. The base liner would be installed before the addition of the waste material and cover soil into the cell. The domed cover structure would be positioned over the first cell to be filled prior to placement of the waste material. The garbage and waste material and cover soil would be ground and deposited into the cell. Alternately the cell could be layered with alternate layers of garbage and waste material and a daily cover of soil. Generally, the garbage and waste material would make up about 80% of the material within the filled cell. The daily cover soil makes up the remaining 20%. However, the garbage and waste material could vary from about 10% to about 100% of the total weight of the filled cell and the cover soil about 0 to about 90% of the total weight of the filled cell.

Mechanisms for withdrawing methane gases and the like from the cell, mechanisms for adding water, recirculated leachate, or the like to the cells, end mechanisms for removing leachate from the bottom of the cell for recycling would be coupled with the cells.

A cover would be placed over the cells once filled and the content of the cells would be allowed to decompose. After positioning of the cover on the filled cell, the domed cover structure would be moved to the next cell. During decomposition, methane or like gases would be withdrawn from the cell and could be utilized to power fans for maintaining the domed cover structure in an erect position over the cell or as fuel for other needs on or off site. The filled cells would be monitored for moisture content. Moisture content would be adjusted to optimize rapid decomposition while minimizing the amount of potential leachate. Water would be pumped into the cell to increase the moisture content if needed. The leachate would be monitored, controlled and, if necessary, removed during the decomposition period of the waste material. This process would be repeated for all of the cells. The process would continue so that the cells would be continually reused. The present invention provides for a reusable landfill with the above-mentioned advantages.

While the above describes the preferred embodiment of the present invention, it will be understood that modifications, variations and alterations may be made to the present invention without deviating from the scope and fair meaning of the subjoined claims.

What is claimed is:

1. A method for continuously processing and reclaiming processed garbage and waste materials and processed cover soil comprising
   providing a plurality of adjacent cells designed to contain alternate layers of a mixture of garbage and waste materials and a layer of cover soil,
   lining each of said cells with a bottom layer of impermeable plastic film and, while filling the cells with alternate layers of mixed garbage and waste material and cover soil, covering each cell with a removable plastic cover,
   when each cell is filled with alternate layers of mixed garbage and waste material and cover soil, replacing said removable cover with a cover of impermeable plastic film sealed to the bottom layer of plastic film,
   introducing controlled amounts of liquid into the sealed cells through conduit means connected thereto to percolate water and leachate through the contents of the sealed cell to control the decomposition of the garbage and waste materials and to enrich the cover soil,
   monitoring the rate of decomposition of the garbage and waste materials within each sealed cell, and
   opening each sealed cell after a period of time and then recovering and separating the usable contents of the open cell and reusing some of the recovered soil as cover soil in adjacent cells.

2. The method according to claim 1 wherein said removable plastic cover comprises a domed structure to prevent the entry of water into an as yet unfilled cell.

3. The method according to claim 2 wherein said dome structure comprises a pressurized dome.

4. The method of claim 3 wherein said pressurized dome is maintained by fans powered by electricity generated from combustible by-products of the processing.

5. The method of claim 4 wherein said combustible by-products include methane gas.

6. The method according to claim 1 further comprising grinding said garbage and waste materials to reduce microenvironments.

7. The method according to claim 1 further comprising removing combustible gases from one or more cells for use outside the cell.

8. The method of claim 7 wherein said combustible gases include methane gas.

9. The method of claim 1 further comprising recovering and utilizing gases resulting from the decomposition of the waste material.

10. The method according to claim 1 further comprising recovering materials after bioreduction and separating nonbiodegradable material from said bioreduced material for reuse.

11. The method of claim 1 wherein said controlled amounts of liquid includes water.

12. The method of claim 11 wherein microorganisms are seeded in the system.

13. The method of claim 12 wherein said microorganisms include acidogens or methanigens.

14. The method of claim 1 wherein said bottom impermeable plastic film is shaped to receive said alternate layers.

15. The method of claim 1 wherein said bottom impermeable plastic film comprises high density polyethylene.

16. The method of claim 15 wherein the thickness of the polythylene film is about 60 mils.

17. The method of claim 15 wherein said cover of impermeable plastic film comprises a film of high density polyethylene about 30 mils thick.

18. The method of claim 1 wherein said conduit means interconnect the cells of draining leachate therefrom and for recirculating leachate through the cells.

19. A method comprising continuously processing garbage and waste materials and cover soil and reclaiming the processed materials and cover soil in a reusable landfill site comprising
   providing a landfill site having a plurality of interconnected adjacent cells including a first cell and succeeding cells,
   lining said first cell with an impermeable plastic film and encapsulating it with a removable plastic cover,
   adding layers of mixed garbage and waste materials between alternate layers of cover soil, and adding water as required, to said first cell until filled,
   replacing said removable plastic cover with an impermeable plastic cover sealed to the impermeable plastic film,
   moving said removable plastic cover to a succeeding cell and repeating the above steps of lining, adding, replacing and completely sealing at least some of the succeeding cells,
   introducing controlled amounts of liquid into the completely sealed interconnected cells to percolate leachate through said materials and cover soil thereby controlling the decomposition of said materials and enriching the cover soil,
   monitoring the rate of decomposition of the garbage and waste materials within each cell,
   recirculating leachate drained from the cells,
   after a period of time, recovering and separating from each cell the processed garbage and waste materials, cover soil and excess leachate into valuable fractions for reuse, and reusing some of the recovered soil as cover soil for use in adjacent cells,
   inspecting said impermeable film if required, and continuously repeating the above processing and recovering steps for each cell.

20. A method according to claim 19 wherein the ratio of said garbage and waste materials to cover soil in said first cell is about 10 to 1.

21. A method according to claim 19 wherein the reclaimed cover soil may be used as top soil, humus or peat.

22. A method according to claim 19 wherein the reclaimed cover soil is reused in a succeeding cell.

* * * * *

UNITED STATES PATENT AND TRADEMARK OFFICE
CERTIFICATE OF CORRECTION

PATENT NO. : 5,356,452
DATED : October 18, 1994
INVENTOR(S) : Robert E. Fahey

It is certified that error appears in the above-identified patent and that said Letters Patent is hereby corrected as shown below:

Col. 1, line 18: "volumee" should read -- volume --

Col. 3, line 10: "show" should read -- shown --

Col. 3, line 51: "operations" should read -- operations. --

Col. 3, line 63: "cell" should read -- cell. --

Col. 4, line 62: "cove red" should read -- covered --

Col. 5, line 24: "s" should read -- shown --

Signed and Sealed this

Tenth Day of January, 1995

Attest:

BRUCE LEHMAN

Attesting Officer

Commissioner of Patents and Trademarks